Sept. 28, 1948. J. P. PEARSE ET AL 2,450,297
APPARATUS FOR BENDING GLASS

Filed Dec. 19, 1941 4 Sheets-Sheet 1

Inventors
JOHN P. PEARSE,
WILLIAM P. BAMFORD.
By Frank Fraser
Attorney

Inventors
JOHN P. PEARSE,
WILLIAM P. BAMFORD.

Sept. 28, 1948.   J. P. PEARSE ET AL   2,450,297
APPARATUS FOR BENDING GLASS

Filed Dec. 19, 1941   4 Sheets-Sheet 4

Inventors
JOHN P. PEARSE,
WILLIAM P. BAMFORD.

By Frank Fraser
Attorney

Patented Sept. 28, 1948

2,450,297

UNITED STATES PATENT OFFICE 2,450,297

APPARATUS FOR BENDING GLASS

John P. Pearse, Swanton, and William P. Bamford, Maumee, Ohio, assignors to Libbey-Owens-Ford Glass Company, Toledo, Ohio, a corporation of Ohio Application December 19, 1941, Serial No. 423,630

15 Claims. (Cl. 49—7)

1

The present invention relates broadly to glass bending and more particularly to the bending of flat sheets or plates of glass to predetermined shapes or curvatures.

It is the primary purpose of this invention to obtain the desired accuracy in the bending of glass sheets or plates without injury to the surface of the glass. Briefly, this is herein accomplished by the provision of means for shielding predetermined chosen portions or areas of the glass sheets or plates to give a time-temperature lag thereto and thus either retard the bending of the shielded areas or maintain them flat.

Another important object of the invention is the provision of an improved form of shielding means for the glass sheet or plate so constructed as to prevent excessive temperature differential between the shielded and unshielded portions or areas thereof during bending whereby to minimize thermal shock and lessen the liability of breakage.

A further important object of the invention is the provision of a novel type of shield positioned above the glass sheet or plate and shaped to give a gradually decreasing shielding effect from one portion of said sheet or plate to an adjacent portion thereof, whereby the temperature differential between the shielded portion and unshielded portion of the said sheet or plate will be gradual so that fracture of the glass along the line of bend will be minimized.

Other objects and advantages of the invention will become more apparent during the course of the following description, when taken in connection with the accompanying drawings.

In the drawings, wherein like numerals are employed to designate like parts throughout the same:

2

Figure 8:
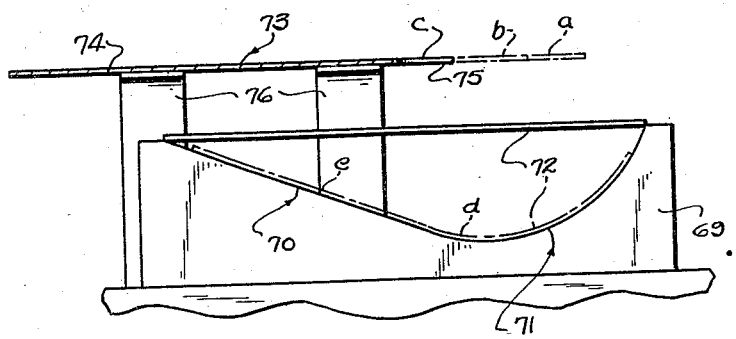
Fig. 8 is a vertical transverse section showing a still further modified form of shield.
Figure 9:
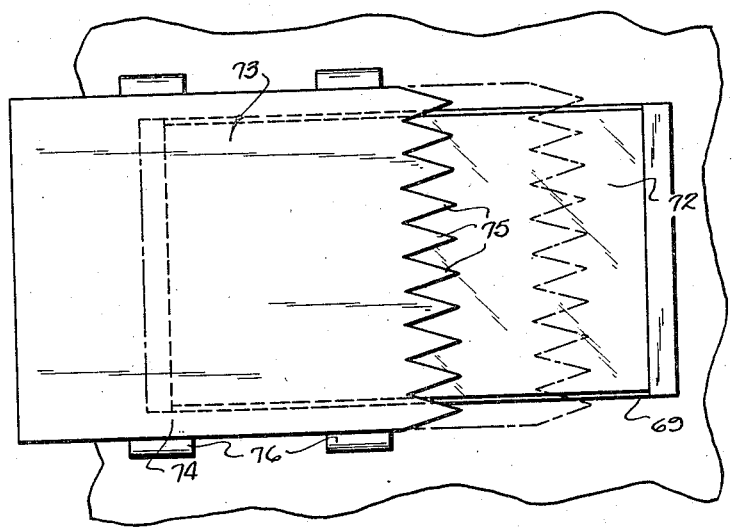

Fig. 9 is a plan view of Fig. 8.

Figures 1, 2:
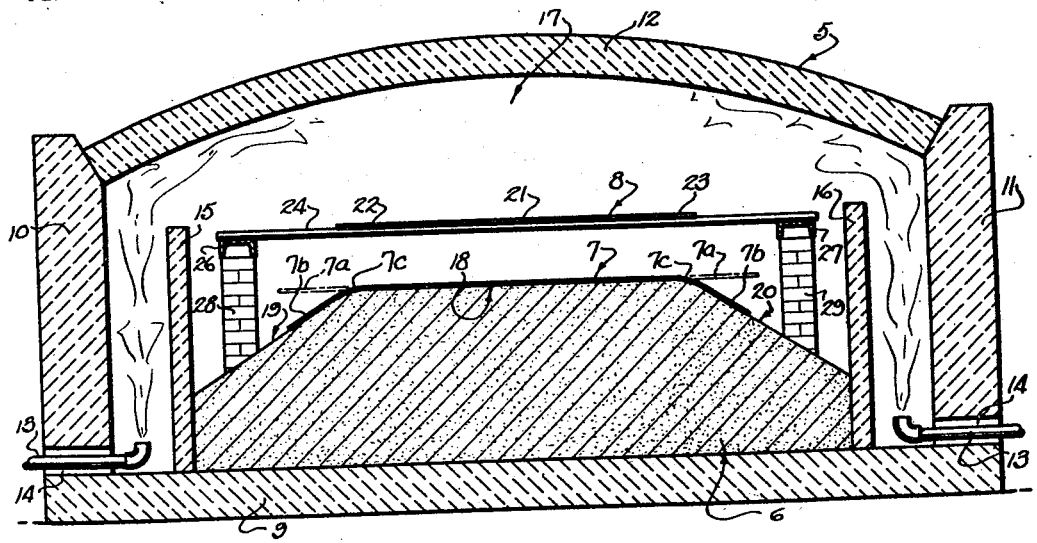
Fig. 1 is a vertical transverse sectional view through one type of bending furnace showing an improved form of shield provided by the invention associated therewith.
Fig. 2 is a plan view of the shield.

With reference now to the drawings, and particularly to the form of invention illustrated in Figs. 1 and 2, the numeral 5 designates in its entirety a bending furnace containing a convex bending mold 6 for supporting the glass sheet or plate 7 to be bent horizontally thereon. Mounted above the bending mold 6 is a novel form of shield provided by the invention and designated generally by the numeral 8.

The bending furnace 5 may be of any suitable construction but is here shown as comprising a bottom 9, opposite vertical side walls 10 and 11 and an arch 12. The furnace is heated by means of gas burners 13 projected through openings 14 in the side walls 10 and 11 adjacent bottom 9. The flames from the burners 13 are directed upwardly toward the arch 12 by vertical baffle walls 15 and 16 spaced inwardly of the side walls 10 and 11 respectively; said baffle walls terminating some distance beneath the arch 12 so that the heating flames pass over the top thereof into the heating chamber 17 of the furnace adjacent the arch.

The bending mold 6 may be formed of sand or other desired material having its upper surface suitably shaped depending upon the type of bend desired. As shown by way of example, the upper surface of the mold comprises a relatively wide, flat central portion 18 and the downwardly inclined end portions 19 and 20. The flat sheet or plate of glass 7 to be bent is laid horizontally upon the mold 6, with the opposite end portions 7a thereof to be bent extending beyond the flat central portion 18 of the mold and overlying the inclined end portions 19 and 20 thereof. Upon heating of the glass sheet 7, the unsupported end portions 7a thereof will be caused to gradually bend downwardly by their own weight until they rest upon the inclined surface portions 19 and 20 of the mold as indicated at 7b.

In order to maintain the central body portion of the glass sheet 7 flat during the bending of the end portions 7a thereof, there is supported above the glass sheet the shield 8. The purpose of this shield is to retard the heating of the central body portion of the glass sheet and prevent it from reaching bending temperature while, at the same time, permitting the heating of the end portions 7a of the sheet to a temperature sufficient to cause them to soften and bend downwardly by their own weight and conform to the shape of the mold.

The shield 8 consists of a substantially rectangular plate comprising a flat imperforate body portion 21, having its opposite ends provided with serrations 22 and 23 in the form of relatively long, narrow, pointed teeth. Otherwise stated, the shield is provided at its opposite ends with spaced cut-out portions resulting in spaced projections which extend in the plane of the body portion 21 of the shield and become progressively narrower towards their outer ends.

The shield 8 may be horizontally supported in any desired manner such as upon a pair of supporting rods 24 and 25 carried at their opposite ends by channel beams 26 and 27 supported at their opposite ends by brick piers or the like 28 and 29. If desired, however, the shield may be hung from the arch of the furnace or otherwise suitably supported.

It will be noted in Fig. 1 that the body portion 21 of the shield 8 is relatively shorter than the central flat surface portion 18 of the mold 6, with the projections or teeth 22 and 23 arranged substantially above the lines of bend indicated at 7c. By positioning the shield in this manner, the body portion 21 thereof serves to effectually shield the flat central portion of the glass sheet 7 from direct radiation and keeps the temperature thereof beneath bending temperature so that it will remain flat. On the other hand, the teeth 22 and 23 have a gradually decreasing shielding effect from the flat central portion of the sheet outwardly to the end portions 7a thereof to be bent thereby, resulting in a progressive and gradually increasing temperature differential between the flat and bent portions of the sheet which minimizes thermal shock proportional to the length of the teeth 22 and 23. This not only reduces liability of breakage of the glass but gives a more accurate bending along the lines 7c while, at the same time, preventing sympathetic bending of the flat portion of the sheet inwardly of the areas of bend. While the teeth 22 and 23 are shown as being pointed, the ends thereof may be rounded or square or the opposite ends of the shield may be scalloped or of any other configuration giving the same result as the pointed teeth.

Figure 3:
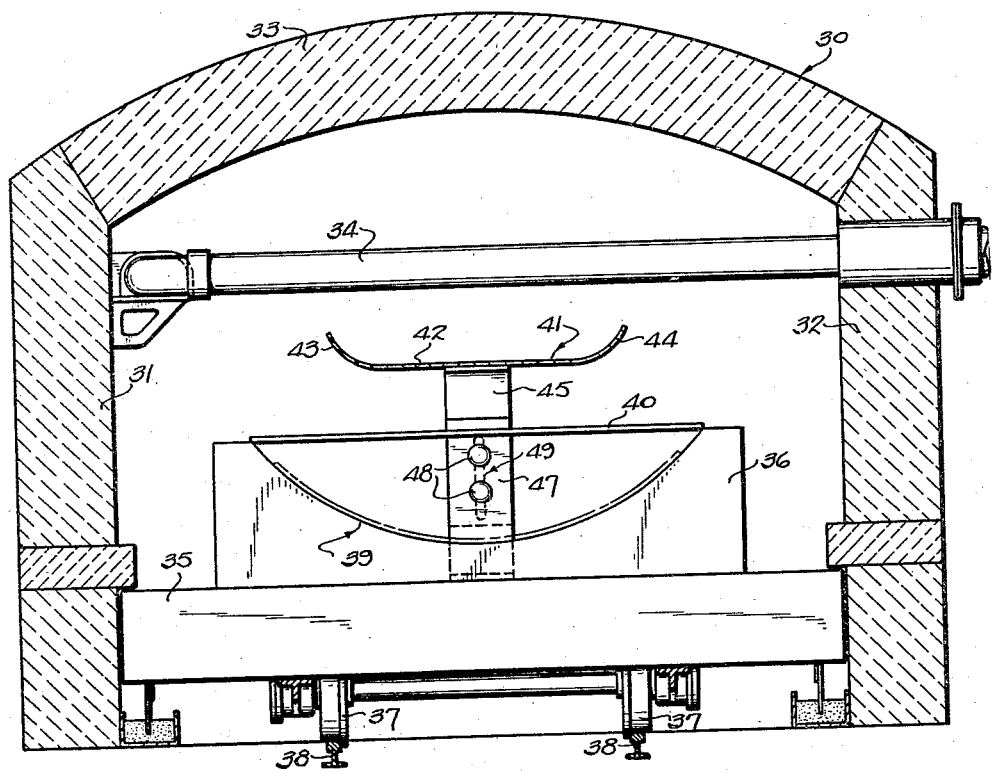
Fig. 3 is a vertical transverse sectional view through another type of bending furnace showing a different form of shield provided by the invention.
Figure 4:
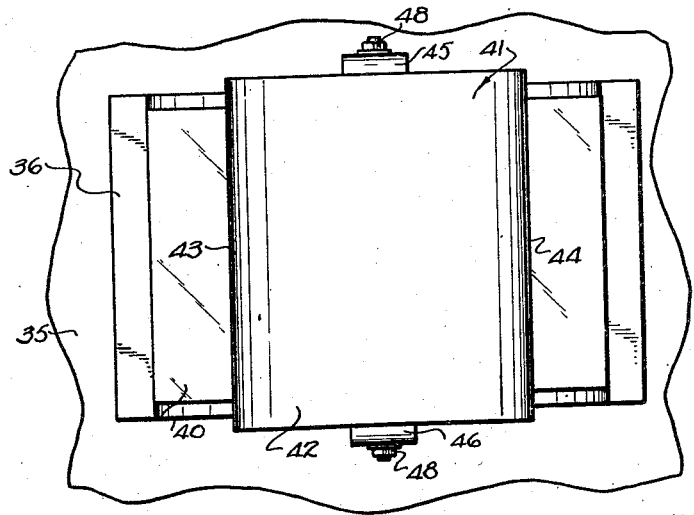
Fig. 4 is a plan view of the shield of Fig. 3.

In Figs. 3 and 4 is illustrated a modified form of shield also embodying the invention and likewise a different type of furnace and bending mold with which the shield may be used. As therein shown, the bending furnace is designated in its entirety by the numeral 30 and includes the opposite vertical side walls 31 and 32 and arch 33. The heating of the furnace may be effected in any desired manner, such as by radiant heating tubes 34 extending transversely thereof adjacent the arch 33. The bending furnace 30 is also preferably of tunnel-like formation and of considerable length so that the glass sheets to be bent may be introduced into one end thereof, carried therethrough, and discharged from the opposite end.

The side walls 31 and 32 of the furnace define therebetween a way for the car or truck 35 carrying the concave bending mold 36; said car being mounted upon wheels 37 rolling along rails 38 which extend longitudinally of the furnace. The upper surface 39 of the bending mold 36 constitutes the shaping surface and is of a curvature corresponding to the curvature to be given the glass sheet 40 to be bent, said sheet being initially supported in a horizontal position upon the top of the mold.

The shield is designated generally by the numeral 41 and comprises a plate member having a flat imperforate body portion 42 and the upwardly and outwardly curved end portions 43 and 44. The shield 41 may be supported in any desired manner, such as by means of vertical end members 45 and 46 secured to said shield and also to fixed standards 47 on car 35 by bolts or the like 48. The bolts 48 preferably pass through slots 49 in the end members 45 and 46 so that the height of the shield 41 relative to the mold 36 can be varied as required, depending upon the size and thickness of sheet to be bent.

With this type of shield, the upwardly and outwardly curved end portions 43 and 44 serve the same purpose as the teeth 22 and 23 in the form of shield shown in Figs. 1 and 2. That is to say, the upwardly and outwardly curved end portions of the shield 41 will also cause a gradual reduction or tapering off of the shielding effect of the shield toward the opposite ends thereof and thus avoid a sharp or abrupt temperature differential between the shielded and unshielded portions of the sheet. This reduces thermal shock and lessens the liability of glass breakage. In this case, however, it is to be noted that the shield is not employed to keep a predetermined portion of the sheet flat during the bending of other portions thereof, but rather to retard the heating of the central portion of the sheet so that all portions of the said sheet will be brought to bending temperature at the same time and thus bend more uniformly.

Figure 5:
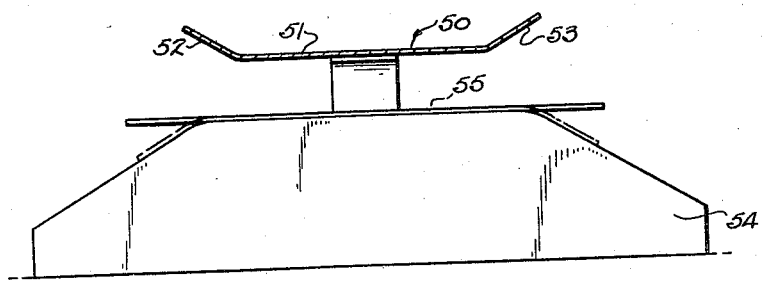
Fig. 5 is a vertical transverse section showing a further modified form of shield.

In Fig. 5 is illustrated another form of shield 50 comprising a flat central body portion 51 and opposite end portions 52 and 53 which incline upwardly and outwardly from said body portion. The inclined end portions 52 and 53 serve substantially the same purpose as the serrated ends of the shield in Fig. 2 or the curved ends of the shield in Fig. 3; namely, to effect a gradual reduction in the shielding of the sheet toward the outer ends thereof, whereby to lessen or smooth out the temperature differential between the shielded portion and unshielded portions of the sheet. While the shield 50 is illustrated in connection with a convex mold 54 for bending a glass sheet 55 in the manner shown in Fig. 1, it may also be used in the bending of glass sheets in concave molds as in Fig. 3.

Figure 6:
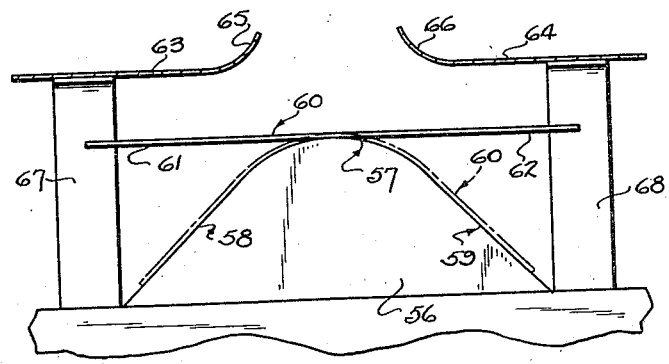
Fig. 6 is a vertical transverse section illustrating the use of a pair of shields.
Figure 7:
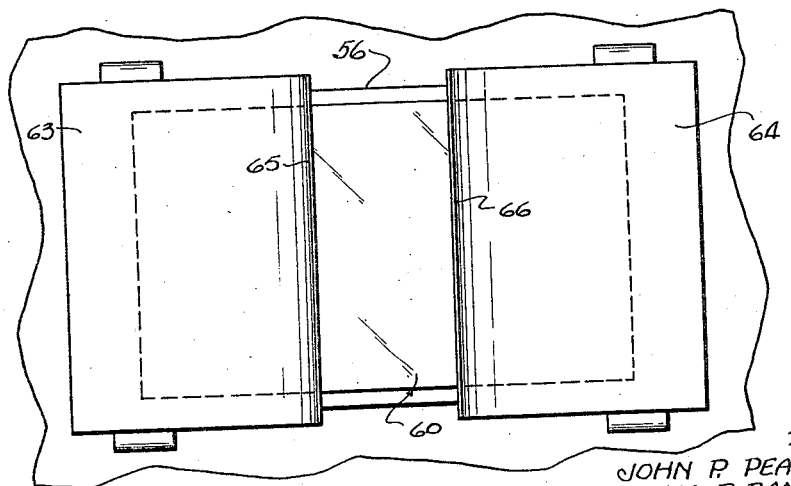
Fig. 7 is a plan view of Fig. 6.

In Figs. 6 and 7 is illustrated a convex mold 56 having a curved central portion 57 and substantially flat inclined end portions 58 and 59. The glass sheet 60 to be bent is placed upon the top of the mold 56, with the opposite end portions 61 and 62 thereof unsupported. Upon heating of the glass sheet, the unsupported end portions 61 and 62 thereof will be caused to bend downwardly to engage the flat surface portions 58 and 59 of the mold and thereby fit the shape of the mold as shown in broken lines in Fig. 6. In order to maintain the end portions 61 and 62 of the glass sheet substantially flat during the bending of the central portion thereof, there are provided two shields 63 and 64 disposed above the end portions 61 and 62 of the sheet and spaced from one another to leave the central portion of the sheet which undergoes bending unprotected. To obtain a gradual diminishing of the temperature of the sheet from the unshielded central portion thereof to the shielded end portions 61 and 62 and thus avoid thermal shock and possible glass breakage, the inner adjacent ends of the shields 63 and 64 may be curved upwardly as at 65 and 66 respectively in the manner shown in Fig. 3. However, the inner adjacent ends of the shields 63 and 64 may be serrated as in Fig. 2, or inclined as in Fig. 5 to accomplish the same purpose. The shields 63 and 64 may be carried upon suitable supports 67 and 68 respectively and can either be mounted in a fixed position or adjustable horizontally toward and away from one another.

In Figs. 8 and 9 is illustrated the use of shielding means in the bending of a glass sheet to form what is commonly known in the art as a J-bend, which comprises a flat portion terminating in a regular or irregular curved portion. For instance, the mold 69 is provided with a shaping surface comprising an inclined flat portion 70 at one end and an irregular curved portion 71 at the other end. The glass sheet 72 to be bent is supported upon the top of the mold 69 and mounted thereabove is a horizontal shield 73. The shield 73 may be of the type illustrated in Figs. 2, 3, or 5 but, by way of example, is similar to that shown in Fig. 2 comprising a flat, imperforate body portion 74 provided at one end thereof with the teeth 75. In forming this type of bend, it is advisable that the shield 73 be moved periodically to different positions as the bending of the sheet progresses. Thus, the shield should be initially positioned as indicated at $a$ so that it substantially completely covers the glass sheet and then, as the bending progresses, it can be gradually withdrawn first to position $b$ and then to position $c$ to uncover more and more of the sheet. To accomplish this, the shield may be slidably carried upon stationary supports 76. This adjustment of the shield greatly facilitates the bending of the curved end portion $d$ of the glass sheet while maintaining the opposite end portion $e$ thereof flat.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for bending glass sheets or plates, bending means upon which the glass sheets are adapted to be bent, means for heating said sheets to bending temperature, and a shield for shielding the glass sheets during bending arranged in spaced relationship to said bending means and in the path of heat rays from said heating means, said shield comprising a plate member having an edge shaped to produce a gradually decreasing shielding effect on the glass sheet from a point opposite said shield to a point beyond the edge thereof.

2. In apparatus for bending glass sheets or plates, a bending mold having a bending surface upon which the glass sheets are adapted to be bent, means for heating said sheets to bending temperature, and a shield for shielding the glass sheets during bending positioned above said bending surface and in the path of heat rays from said heating means, said shield comprising a plate member having a body portion and an end portion which is shaped to produce a gradually decreasing shielding effect on the glass sheet from a point opposite the body portion of said shield to a point beyond the end thereof.

3. In apparatus for bending glass sheets or plates, bending means upon which the glass sheets are adapted to be bent, means for heating said sheets to bending temperature, and a shield for shielding the glass sheets during bending arranged in spaced relationship to said bending means and in the path of heat rays from said heating means, said shield comprising a plate member having a substantially flat imperforate body portion and an end portion shaped to produce a gradually decreasing shielding effect on the glass sheet from a point opposite the body portion of said shield to a point beyond the end thereof.

4. In apparatus for bending glass sheets or plates, bending means upon which the glass sheets are adapted to be bent, means for heating said sheets to bending temperature, and a shield for shielding the glass sheets during bending arranged in spaced relationship to said bending means and in the path of heat rays from said heating means, said shield comprising a plate member having a body portion provided at one end with spaced cut-out portions resulting in spaced projecting portions extending in the plane of said body portion and being narrower at their outer ends than at their inner ends.

5. In apparatus for bending glass sheets or plates, bending means upon which the glass sheets are adapted to be bent, means for heating said sheets to bending temperature, and a shield for shielding the glass sheets during bending arranged in spaced relationship to said bending means and in the path of heat rays from said heating means, said shields comprising a plate member having a body portion provided at one end with spaced projection extending in the plane of said body portion and becoming progressively narrower towards their outer ends.

6. In apparatus for bending glass sheets or plates, bending means upon which the glass sheets are adapted to be bent, means for heating said sheets to bending temperature, and a shield for shielding the glass sheets during bending arranged in spaced relationship to said bending means and in the path of heat rays from said heating means, said shield comprising a plate member having a substantially flat imperforate body portion provided with at least one serrated edge.

7. In apparatus for bending glass sheets or plates, bending means upon which the glass sheets are adapted to be bent, means for heating said sheets to bending temperature, and a shield for shielding the glass sheets during bending arranged in spaced relationship to said bending means and in the path of heat rays from said heating means, said shield comprising a plate member having a body portion and an end portion directed away from the glass sheet and out of the plane of said body portion to produce a gradually decreasing shielding effect on the glass sheet from a point opposite the body portion of said shield to a point beyond the end thereof.

8. In apparatus for bending glass sheets or plates, bending means upon which the glass sheets are adapted to be bent, means for heating said sheets to bending temperature, and a shield for shielding the glass sheets during bending arranged in spaced relationship to said bending means and in the path of heat rays from said heating means, said shield comprising a plate member having a body portion and an end portion curving upwardly and outwardly with respect to said body portion and away from the bending means.

9. In apparatus for bending glass sheets or plates, bending means upon which the glass sheets are adapted to be bent, means for heating said sheets to bending temperature, and a shield for shielding the glass sheets during bending arranged in spaced relationship to said bending means and in the path of heat rays from said heating means, said shield comprising a plate member having a body portion and an portion extending upwardly and outwardly at an angle with respect to said body portion and away from the bending means.

10. In apparatus for bending glass sheets or plates, a shaping surface upon which the glass sheets are adapted to be bent, means for heating said sheets to bending temperature, and a shield for shielding selected portions of the glass sheets during bending, comprising a plate member spaced from said shaping surface and positioned in the path of heat rays from said heating means to said sheets.

11. In apparatus for bending glass sheets or plates, a shaping surface upon which the glass sheets are adapted to be bent, means for heating said sheets to the bending temperature, and a shield for shielding the glass sheets during bending arranged in the path of heat from said heating means to said sheets, said shield comprising a plate member having a main body portion and parts associated therewith that are formed to give a lesser shielding action than is afforded by the main body of the member.

12. In apparatus for bending glass sheets or plates, a shaping surface upon which the glass sheets are adapted to be bent, means for heating said sheets to the bending temperature, and a shield for shielding the glass sheets during bending arranged in the path of heat from said heating means to said sheets, said shield comprising a plate member provided with cut-out portions at selected points to reduce the amount of shielding action.

13. In apparatus for bending glass sheets or plates, a shaping surface upon which a sheet is adapted to be bent, means for heating the sheet to bending temperature, and a shield for shielding selected portions of said sheet during bending arranged in spaced relationship to said shaping surface and in the path of heat from the heating means.

14. In a method of bending glass sheets or plates wherein the sheets to be treated are placed on a shaping surface and then exposed to bending heat, the step of controlling the bending of the glass sheets by shielding selected portions only of said sheets by positioning a shield at a location spaced from the shaping surface and glass but in the path of said heat to the glass to retard the heating of said selected portions during the bending operation.

15. In a method of bending glass sheets or plates wherein the sheets to be treated are placed on a bending mold and then heated to bending temperature, the steps of controlling the bending of the glass sheets by shielding selected portions of said sheets to retard the heating thereof and providing a progressively lessening shielding action from the shielded to the unshielded portions of the glass sheets during the bending operation.

JOHN P. PEARSE.
WILLIAM P. BAMFORD.

REFERENCES CITED

The following references are of record in the file of this patent:

UNITED STATES PATENTS

| Number | Name | Date |
| --- | --- | --- |
| 760,959 | Connington | May 24, 1904 |
| 1,582,374 | Berglund | Apr. 27, 1926 |
| 1,999,721 | Dimmick | Apr. 30, 1935 |
| 2,215,228 | Oliver | Sept. 17, 1940 |
| 2,218,254 | Wengel | Oct. 15, 1940 |
| 2,235,352 | Bates | Mar. 18, 1941 |
| 2,348,278 | Boyles et al. | May 9, 1944 |

FOREIGN PATENTS

| Number | Country | Date |
| --- | --- | --- |
| 3,093 | Great Britain | Aug. 14, 1877 |
| 8,208 | Great Britain | May 26, 1884 |
| 351,862 | Great Britain | July 2, 1931 |

Certificate of Correction

Patent No. 2,450,297. September 28, 1948.

JOHN P. PEARSE ET AL.

It is hereby certified that error appears in the printed specification of the above numbered patent requiring correction as follows:

Column 6, line 27, claim 5, for the word "projection" read *projections*; and that the said Letters Patent should be read with this correction therein that the same may conform to the record of the case in the Patent Office.

Signed and sealed this 8th day of February, A. D. 1949.

[SEAL]

THOMAS F. MURPHY,
*Assistant Commissioner of Patents.*